United States Patent
Clippingdale et al.

[15] 3,678,155
[45] July 18, 1972

[54] TOOTHPASTES

[72] Inventors: John Walter Clippingdale, Egham; Charles Andrew Watson, Ruislip, both of England

[73] Assignee: Lever Brothers Company, New York, N.Y.

[22] Filed: Oct. 15, 1969

[21] Appl. No.: 866,721

[30] Foreign Application Priority Data

Oct. 29, 1968  Great Britain ............................51286

[52] U.S. Cl. ....................................................................424/52
[51] Int. Cl. .................................................................A61k 7/16
[58] Field of Search ..................................424/49–58; 167/93

[56] References Cited

FOREIGN PATENTS OR APPLICATIONS 1,559,196  1/1969  France.......................................424/49
6,803,011  9/1968  Netherlands..............................424/52

*Primary Examiner*—Richard L. Huff
*Attorney*—Louis F. Kline, Jr., Melvin H. Kurtz and Edgar E. Ruff

[57] ABSTRACT

Using milled alpha-alumina trihydrate as a toothpaste abrasive can sometimes give rise to corrosion of unlacquered aluminum tubes accompanied by the production of hydrogen gas. This can be prevented by including in the toothpaste a source of monofluorophosphate ions.

8 Claims, No Drawings

TOOTHPASTES

This invention relates to toothpastes and in particular to toothpastes comprising alpha-alumina trihydrate.

In work we have carried out on the formulation of toothpastes containing alpha-alumina trihydrate as abrasive cleaning agent, instances occurred in which the alumina gave rise to corrosion of unlacquered aluminum tubes accompanied by the swelling of the tubes due to the production of hydrogen gas when the toothpaste was stored. These instances of corrosive action occurred when a different method was employed for milling and classifying the relatively coarse hydrated alumina raw material. The alumina trihydrate used in our experiments was made by the Bayer process in which alumina is precipitated from a solution of sodium aluminate, washed and then dried at a low temperature. The corrosive action occurred even at neutral pH and so could not have been caused by any residual alkalinity of the alumina.

We have, however, discovered that milled hydrated alumina having corrosive properties can be stabilized and rendered non-corrosive by including in the toothpaste a source of monoflurophosphate ions. The mechanism of the stabilization of otherwise corrosive grades of alumina is not understood but it may perhaps be due to modification of the surface characteristics of the alumina particles.

According to the present invention, therefore, there is provided a toothpaste contained in an unlacquered aluminum tube and comprising a milled alpha-alumina trihydrate stabilized by including in the toothpaste a source of monofluorophosphate ions, the milled alumina employed being such that without stabilization it would otherwise cause corrosion of the aluminum tube and gassing to occur.

Examples of sources of monofluorophosphate ions that may be employed are the alkali metal, alkaline-earth metal and ammonium monofluorophosphates. Amine monofluorophosphates, such as the triethanolamine salt, can also be used. Other monofluorophosphates, for example stannous monofluorophosphate, can also be employed.

The effective amount of monofluorophosphate may be determined by suitable experiment but will usually be at least 0.1 by weight of the toothpaste. For most practical purposes the amount used will lie between 0.1 and 2.5 percent by weight of the toothpaste, the actual amount of the monofluorophosphate depending on the amount of alumina used and the particular monofluorophosphate used.

In order to avoid acid or alkaline attack of the aluminum it is necessary to control the pH so that it is in the range about 6 to about 8. This is conveniently effected by including benzoic acid in the toothpaste.

The invention is applicable to a wide range of toothpaste formulas but is especially applicable to those containing substantial amounts of hydrated alumina, such as from 25 to 60 percent by weight of the toothpaste.

The following example illustrates the invention.

EXAMPLE

A toothpaste was made to the following composition using a Bayer process alumina which had been milled to a size suitable for use as a toothpaste abrasive cleaning agent.

| Ingredient | % by weight |
| --- | --- |
| Milled alpha-alumina trihydrate | 55.00 |
| Sorbitol (70% syrup) | 27.00 |
| Sodium carboxymethyl cellulose | 0.80 |
| Benzoic acid | 0.15 |
| Sodium lauryl sulphate | 1.50 |
| Titanium dioxide | 0.50 |
| Saccharin | 0.20 |
| Peppermint flavor | 1.00 |
| Water | to 100.00 |
| pH 6.4 | |

When packed in aluminum tubes which were not lacquered internally, and stored for 3 months at 37° C., gassing was found to have occurred within the tube (mainly hydrogen gas) and signs of tube corrosion were noted.

The addition of 8 percent of sodium monofluorophosphate to the above toothpaste product stabilized the alumina Experiments have shown that stabilization is also effected by inclusion of 0.1, 1 or 2 percent of sodium monofluorophosphate.

Our copending application Ser. No. 707,325 relates to a dentifrice containing a total content of abrasive agent of at least 40 percent by weight, the abrasive agent comprising an amount of at least 30 percent by weight of the dentifrice of alpha-aluminatrihydrate having a particle size distribution such that at least 20 percent by weight of the particles have a size greater than 20 microns. The use of alpha-alumina trihydrate of such relatively large particle size gives dentifrices having very good cleaning properties while causing unexpectedly low damage to tooth enamel. The inclusion of therapeutic materials, for example sodium monofluorophosphate, in these dentifrices is referred to in the copending application. However, the copending application does not refer to the fact that the use of alpha-alumina trihydrate in a toothpaste can sometimes cause corrosion of unlacquered aluminum tubes and swelling of the tubes due to gas production, or to the stabilizing effect of sodium monofluorophosphate. The use of a monofluorophosphate as a stabilizer in accordance with the present invention is not limited to the use as an abrasive of alpha-alumina trihydrate of any special particle size but the stabilizer can be used if desired with an alpha-alumina trihydrate having a particle size distribution such that less than 20 percent by weight of the particles have a size greater than 20 microns.

What is claimed is:

1. A toothpaste composition contained in an unlacquered aluminum tube comprising from about 25 percent to about 60 percent by weight of milled alpha-alumina trihydrate, and a stabilizer comprising a source of monofluorophosphate ions effective to stabilize said alpha-alumina trihydrate against corrosion of said tubes, said milled alpha-alumina trihydrate normally tending to corrode said tubes.

2. A toothpaste as claimed in claim 1 wherein the milled alpha-alumina trihydrate is stabilized by including in the toothpaste from about 0.1 percent to about 2.5 percent by weight of a monofluorophosphate selected from the group consisting of the alkali metal, alkaline-earth metal, ammonium, amine and stannous monofluorophosphates.

3. A toothpaste composition as claimed in claim 1 wherein the monofluorophosphate is sodium monofluorophosphate.

4. A toothpaste composition in accordance with claim 1 wherein said milled alpha-alumina trihydrate has a particle size such that less than 20 percent by weight of the particles have a size greater than 20 microns.

5. A toothpaste composition in accordance with claim 1 having a pH of about 6 to about 8.

6. A toothpaste composition in accordance with claim 5 which also contains benzoic acid.

7. A toothpaste in accordance with claim 5 wherein said source of monofluorophosphate ions is an alkali metal, alkaline earth metal, ammonium, amine, or stannous monofluorophosphate.

8. A toothpaste in accordance with claim 5 wherein said source of monofluorophosphate ions is sodium monofluorophosphate.

* * * * *

UNITED STATES PATENT AND TRADEMARK OFFICE
CERTIFICATE OF CORRECTION

PATENT NO. : 3,678,155
DATED : July 18, 1972
INVENTOR(S) : John Walter Clippingdale and Charles Andrew Watson It is certified that error appears in the above-identified patent and that said Letters Patent are hereby corrected as shown below:

Column 2, line 10, the number "8" should read --0.8--.

Signed and Sealed this

Sixth Day of August 1985

[SEAL]

Attest:

DONALD J. QUIGG

Attesting Officer

Acting Commissioner of Patents and Trademarks